(12) United States Patent
Igarashi

(10) Patent No.: US 8,605,309 B2
(45) Date of Patent: Dec. 10, 2013

(54) IMAGE PROCESSING APPARATUS, IMAGE FORMING SYSTEM, IMAGE PROCESSING METHOD AND COMPUTER READABLE MEDIUM STORING PROGRAM

(75) Inventor: Masatomo Igarashi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1075 days.

(21) Appl. No.: 12/481,038

(22) Filed: Jun. 9, 2009

(65) Prior Publication Data

US 2009/0251732 A1 Oct. 8, 2009

Related U.S. Application Data

(63) Continuation-in-part of application No. 12/336,914, filed on Dec. 17, 2008, now abandoned.

(30) Foreign Application Priority Data

Apr. 2, 2008 (JP) ................................. 2008-095779
Mar. 24, 2009 (JP) ................................. 2009-071241

(51) Int. Cl.
*G06F 3/12* (2006.01)

(52) U.S. Cl.
USPC ........................................ 358/1.15; 718/100

(58) Field of Classification Search
None
See application file for complete search history.

(56) References Cited

U.S. PATENT DOCUMENTS

| | | | |
|---|---|---|---|
| 8,018,612 B2 | 9/2011 | Matsushita et al. | |
| 2003/0053086 A1 | 3/2003 | Chen et al. | |
| 2004/0003309 A1* | 1/2004 | Cai et al. | 713/320 |
| 2004/0187126 A1* | 9/2004 | Yoshimura | 718/100 |
| 2008/0158574 A1* | 7/2008 | Sugiyama | 358/1.1 |

FOREIGN PATENT DOCUMENTS

| | | | |
|---|---|---|---|
| JP | 2000-335055 A | 12/2000 | |
| JP | 2003-179767 A | 6/2003 | |
| JP | 2007-274525 A | 10/2007 | |

OTHER PUBLICATIONS

Japanese Office Action dated Mar. 4, 2013 issued in Japanese Application No. 2009-071241.

* cited by examiner

*Primary Examiner* — Thomas D Lee
*Assistant Examiner* — Neil R McLean
(74) *Attorney, Agent, or Firm* — Sughrue Mion, PLLC

(57) ABSTRACT

An image processing apparatus includes: plural drawing processing units that perform the image processing based on designation of an image processing command which designates plural types of image processing; and a determination unit that determines whether the respective image processing designated with the image processing command is performed by one of the plurality of drawing processing units, or performed by the plurality of drawing processing units, based on image processing time necessary for execution of the respective image processing designated with the image processing command. The image processing apparatus also includes a power source controller that, in a case where the determination unit determines that the respective image processing designated with the image processing command is performed by one of the plurality of drawing processing units, reduces power consumption of other drawing processing units than the one drawing processing unit, in comparison with a case where the respective image processing designated with the image processing command is performed by the plurality of drawing processing units.

17 Claims, 14 Drawing Sheets

FIG. 4

PRINTING APPARATUS SPEED TABLE

| IDENTIFICATION CODE | PRINTING SPEED |
|---|---|
| 100582 | A4 60 PAGES/MINUTE |
| 400236 | A4 120 PAGES/MINUTE |
| 100368 | A4 80 PAGES/MINUTE |
| 100101 | A4 90 PAGES/MINUTE |

FIG. 10

| IMAGE PROCESSING TYPE | PROCESSING TIME PER UNIT PIXELS |
|---|---|
| JPEG COMPRESSION/ DECOMPRESSION PROCESSING | 10ms/M PIXELS |
| EXPANSION/REDUCTION PROCESSING | 30ms/M PIXELS |
| ROTATION PROCESSING | 30ms/M PIXELS |
| COLOR CONVERSION PROCESSING | 20ms/M PIXELS (MEMORY ACCESS) |
| SCREEN PROCESSING | 20ms/M PIXELS (MEMORY ACCESS) |

FIG. 12

| CONTENTS OF IMAGE PROCESSING | IMAGE PROCESSING TIME CALCULATION | IMAGE PROCESSING TIME |
|---|---|---|
| JPEG COMPRESSION/ DECOMPRESSION PROCESSING | 3500×2500/(1024×1024)=8.344M PIXELS 8.344×10ms=83.34ms | 83.34ms |
| EXPANSION/REDUCTION PROCESSING | 7000×5009/(1024×1024)33.79M PIXELS 33.79×30ms=1001.36ms | 1001.36ms |
| ROTATION PROCESSING | NONE | 0ms |
| COLOR CONVERSION PROCESSING | 7000×5009/(1024×1024)33.79M PIXELS 33.79×20ms=667.57ms | 667.57ms |
| SCREEN PROCESSING | 7000×5009/(1024×1024)33.79M PIXELS 33.79×20ms=667.57ms | 667.57ms |
| | TOTAL VALUE OF IMAGE PROCESSING TIMES | 2419.94ms |

FIG. 14

| DRAWING PROCESSOR IN CHARGE / REQUIRED IMAGE PROCESSING TIME | 1200ms | 2500ms |
|---|---|---|
| DRAWING PROCESSOR 61 | JPEG COMPRESSION/ DECOMPRESSION PROCESSING | JPEG DECOMPRESSION, EXPANSION/REDUCTION, COLOR CONVERSION, SCREEN PROCESSING |
| DRAWING PROCESSOR 62 | EXPANSION/REDUCTION PROCESSING | (POWER SOURCE OFF) |
| DRAWING PROCESSOR 63 | COLOR CONVERSION AND SCREEN PROCESSING | (POWER SOURCE OFF) |

IMAGE PROCESSING APPARATUS, IMAGE FORMING SYSTEM, IMAGE PROCESSING METHOD AND COMPUTER READABLE MEDIUM STORING PROGRAM

CROSS-REFERENCE TO RELATED APPLICATIONS

This application is a Continuation-in-part of application Ser. No. 12/336,914 filed Dec. 17, 2008 and claims priority under 35 U.S.C. §119 from Japanese Patent Application No. 2008-095779 filed Apr. 2, 2008 and Japanese Patent Application No. 2009-071241 filed on Mar. 24, 2009. The entire disclosures of the prior applications, application Ser. Nos. 12/336,914, JP 2008-095779 and JP 2009-071241 are considered part of the disclosure of the accompanying continuation application and are hereby incorporated by reference.

BACKGROUND

Technical Field

The present invention relates to an image processing apparatus, an image forming system, an image processing method and a computer readable medium storing a program.

SUMMARY

According to an aspect of the present invention, there is provided an image processing apparatus including:

a plurality of drawing processing units that perform the image processing based on designation of an image processing command, the image processing command designating a plurality of types of image processing;

a determination unit that determines whether the respective image processing designated with the image processing command is performed by one of the plurality of drawing processing units, or performed by the plurality of drawing processing units, based on image processing time necessary for execution of the respective image processing designated with the image processing command; and a power source controller that, in a case where the determination unit determines that the respective image processing designated with the image processing command is performed by one of the plurality of drawing processing units, reduces power consumption of other drawing processing units than the one drawing processing unit, in comparison with a case where the respective image processing designated with the image processing command is performed by the plurality of drawing processing units.

BRIEF DESCRIPTION OF THE DRAWINGS

An exemplary embodiment of the present invention will be described in detail based on the following figures, wherein:

FIG. 4 is an example of a printing apparatus speed table stored in a printing apparatus speed table storage part 90;

FIG. 10 is a table as an example of a processing time table used by a system controller 41 for calculation of time necessary for execution of respective image processing;

FIG. 12 is a table showing an example of calculation of processing time by referring to the processing time table shown in FIG. 10 regarding the image processing command shown in FIG. 9;

FIG. 14 is a table showing changes of the number of necessary drawing processors in correspondence with required processing time.

DETAILED DESCRIPTION

Next, an exemplary embodiment of the present invention will be described in detail with reference to the drawings.

Figure 1:
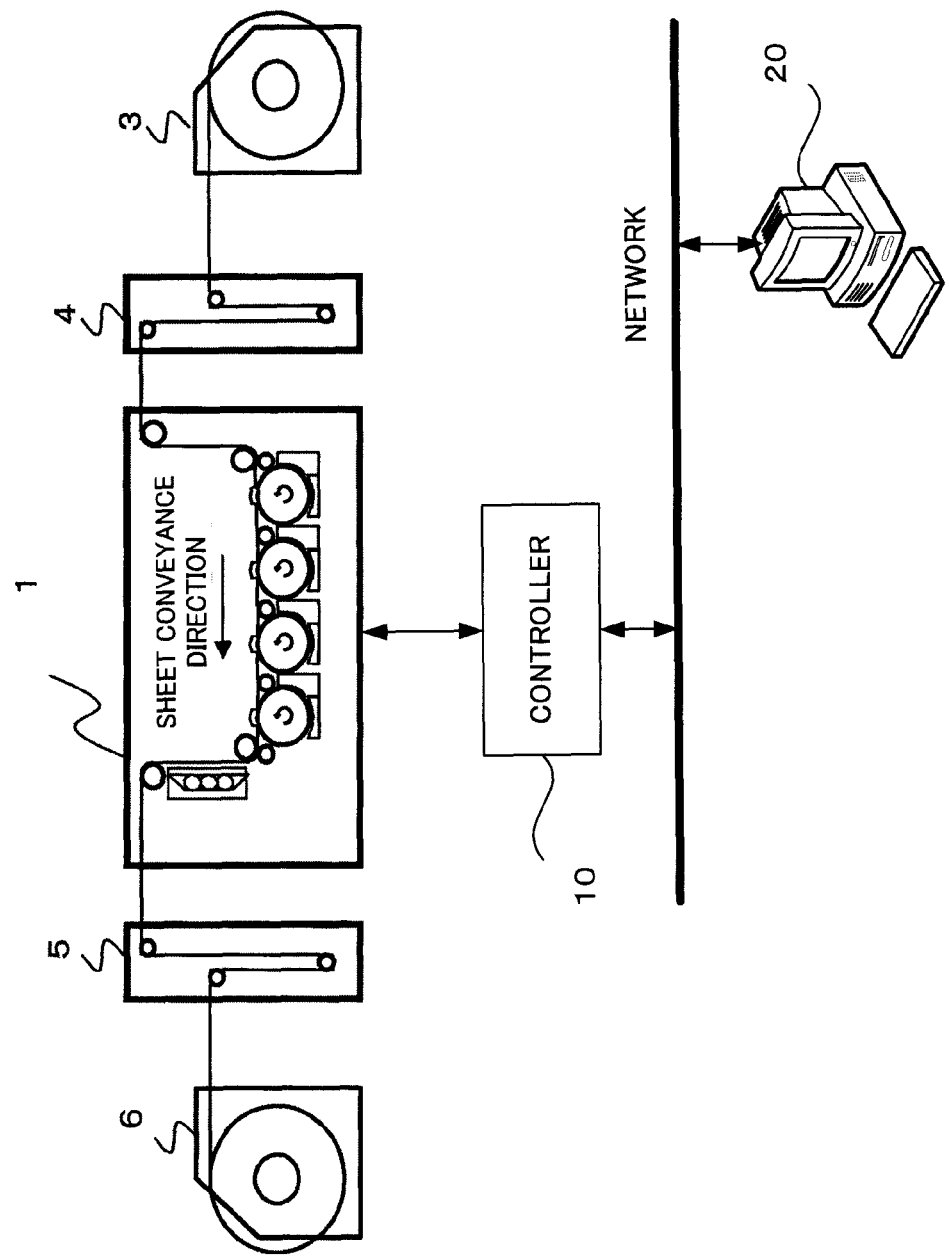
FIG. 1 is a block diagram showing a system configuration of an image forming system according to an exemplary embodiment of the present invention.

FIG. 1 is a block diagram showing an example of a system configuration of an image forming system according to the exemplary embodiment of the present invention. As shown in FIG. 1, the image forming system has a preprocessing device 3, a buffer device 4, a printing apparatus 1 which performs printing on a continuous sheet, a buffer device 5, a post-processing device 6, a controller 10, and a terminal device 20.

The preprocessing device 3 feeds an unprinted continuous sheet, which is in a rolled status, to the printing apparatus 1 as its preprocessing. The post-processing device 6 receives the continuous sheet, which has been subjected to printing and sent from the printing apparatus 1, and rolls the continuous sheet up as its post-processing. The buffer devices 4 and 5 are provided for absorption of a difference between a speed of conveyance of the continuous sheet by the preprocessing device 3 or the post-processing device 6 and a speed of conveyance of the continuous sheet in the printing apparatus 1, so as to maintain a constant tension of the continuous sheet between the buffer devices.

The terminal device 20 generates a print instruction for a print job so as cause the printing apparatus 1 to perform printing on a continuous sheet, and transmits the print job and the print instruction via a network to the controller 10. The controller 10 functions as a print controller which converts the print job into image data in a format printable for the printing apparatus 1, i.e., raster image data, in accordance with the print job and the print instruction transmitted from the terminal device 20 and controls a printing operation of the printing apparatus 1 such that the raster image data is print-outputted by the printing apparatus 1 on a continuous sheet. Note that the raster data represents an image, divided into grid-shaped fine points (pixels), with numeric values indicating colors and densities of the fine points using a color system such as RGB or YMCK system. The printing apparatus 1 print-outputs image data corresponding to the print instruction on the continuous sheet based on the control by the controller 10.

Figure 2:
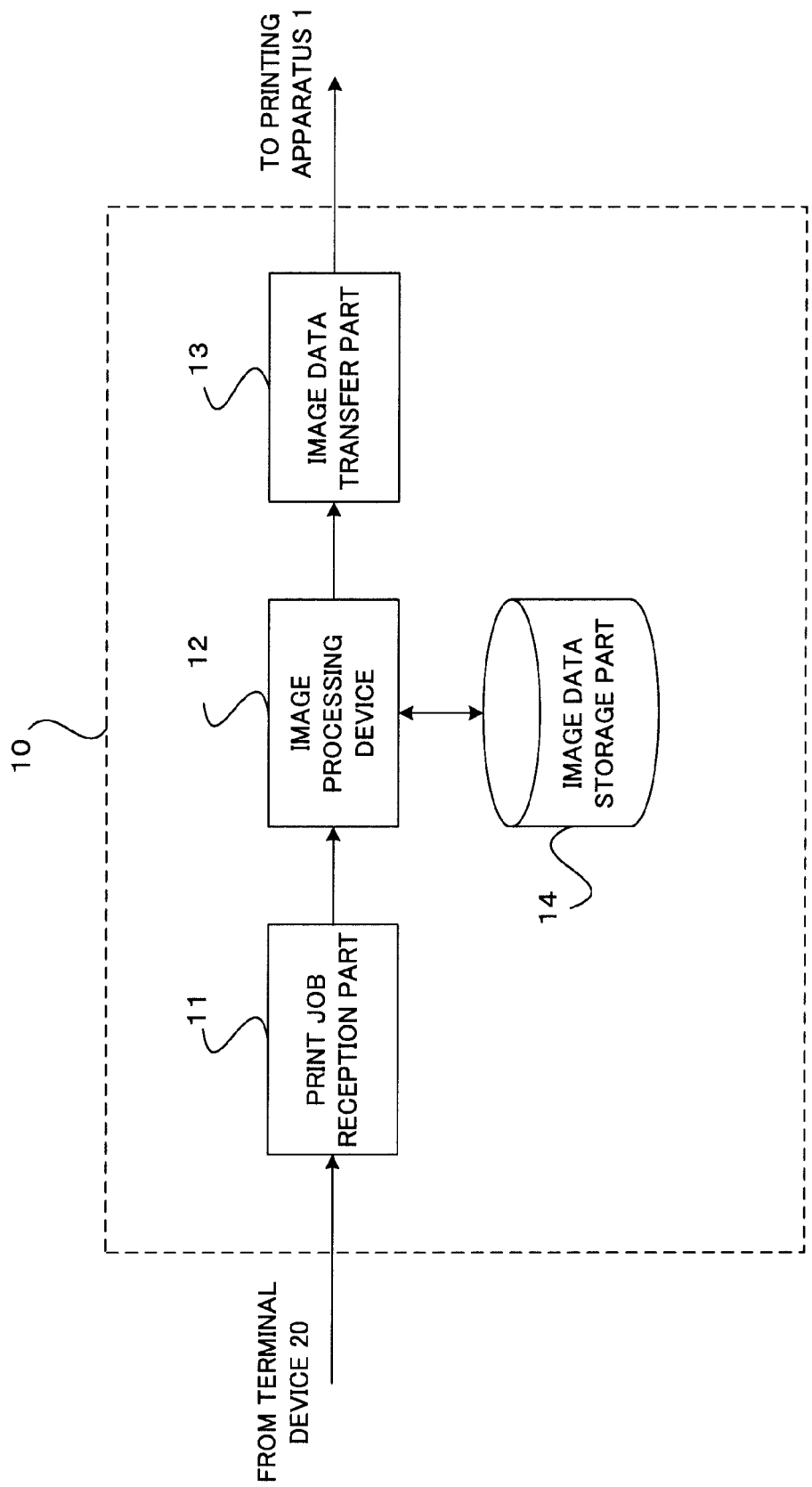
FIG. 2 is a block diagram showing a functional configuration of a controller 10 in the image forming system according to the exemplary embodiment of the present invention.

FIG. 2 is a block diagram showing a functional configuration of the controller 10 shown in FIG. 1.

As shown in FIG. 2, the controller 10 has a print job reception part 11, an image processing device 12, an image data transfer part 13, and an image data storage part 14.

The print job reception part 11 receives a print job transmitted from the terminal device 20. The image processing device 12 performs designated various image processing on the print job received by the print job reception part 11, converts the print job into raster image data as image data in a format printable for the printing apparatus 1, and stores the raster image data into the image data storage part 14. The image data transfer part 13 transfers the print data subjected to image processing, stored in the image data storage part 14, to the printing apparatus 1.

Figure 3:
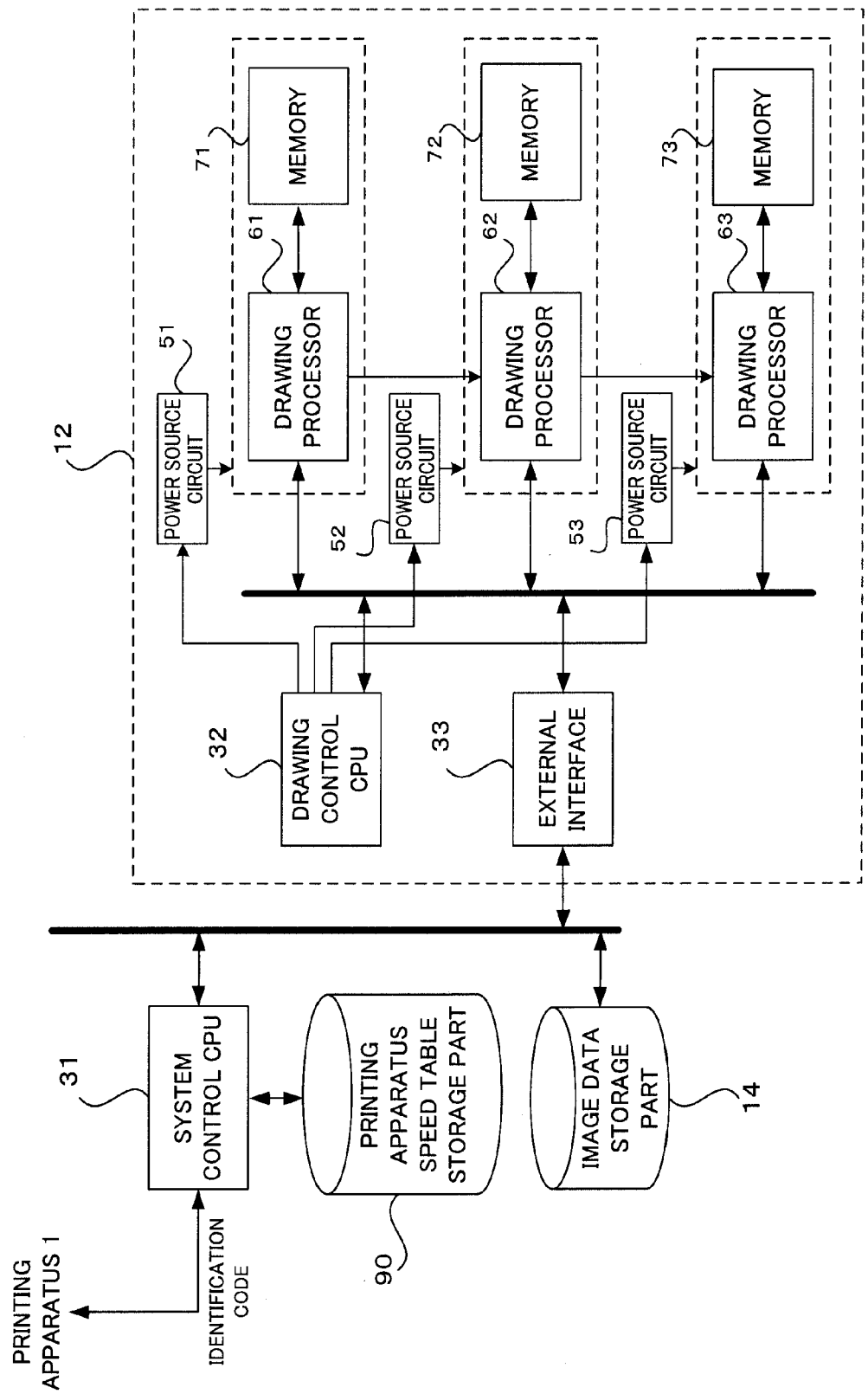
FIG. 3 is a block diagram showing a hardware configuration of an image processing device 12 in the image forming system according to the exemplary embodiment of the present invention.

Next, FIG. 3 shows a hardware configuration of the image processing device 12. As shown in FIG. 3, the image processing device 12 has a drawing control CPU 32, an external interface 33, power source circuits 51 to 53, drawing processors 61 to 63, and memories 71 to 73. The drawing control CPU 32 is used as an example of a determination unit, and the drawing processors 61 to 63 are used as an example of drawing processing units.

Note that in the present exemplary embodiment, drawing processing is performed by three drawing processors 61 to 63 for the sake of simplification of explanation; however, the present invention is not limited to this number of drawing processors. For example, the present invention is similarly applicable to drawing processing performed by four or more drawing processors.

Further, it may be arranged such that processing by the drawing control CPU 32 is performed by the drawing processor 61, and the drawing control CPU 32 is omitted. That is, the drawing processor 61 may operate as a master of the drawing processors 62 and 63.

The system control CPU 31 as a control device is a CPU which controls the operation of the controller 10. The system control CPU 31 transmits an image processing command thereby to cause the image processing device 12 to perform various image processing. Further, a printing apparatus speed table storage part 90 is connected to the system control CPU 31.

As shown in FIG. 4, the printing apparatus speed table storage part 90 holds a printing apparatus speed table showing the relation between identification codes and printing speeds. The system control CPU 31 performs communication with the printing apparatus 1 during initialization processing after power-on, thereby obtains various information such as an identification code of the connected printing apparatus 1, the amount of residual ink and the like. The system control CPU 31 refers to the printing apparatus speed table in the printing apparatus speed table storage part 90 based on the identification code obtained at this time, to obtain printing speed information of the connected printing apparatus 1.

For example, when the identification code received by the system control CPU 31 from the printing apparatus 1 is "400236", the system control CPU 31 determines that, at the printing speed, the connected printing apparatus 1 is capable of performing printing 120 pages in A4 size.

Note that in the present exemplary embodiment, the system control CPU 31 obtains an identification code from the printing apparatus 1 and obtains printing speed information based on the identification code; however, it may be arranged such that the system control CPU 31 obtains the printing speed information directly from the printing apparatus 1. In this case, the printing apparatus speed table storage part 90 can be omitted.

Figure 5:
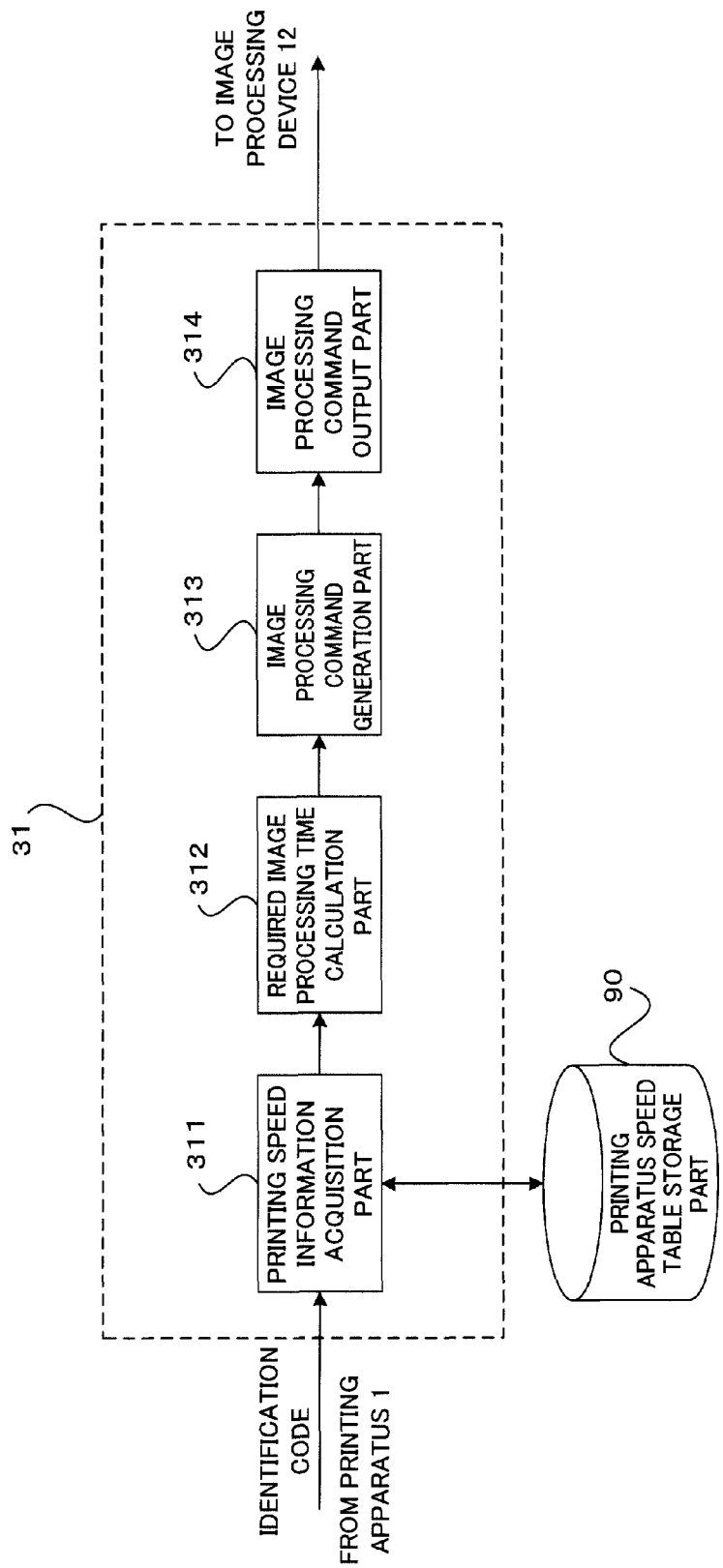
FIG. 5 is a block diagram showing a functional configuration of a system control CPU 31.

Next, FIG. 5 shows a functional configuration of the system control CPU 31. As shown in FIG. 5, the system control CPU 31 has a printing speed information acquisition part 311, a required image processing time calculation part 312, an image processing command generation part 313 and an image processing command output part 314.

The printing speed information acquisition part 311 refers to the printing apparatus speed table stored in the printing apparatus speed table storage part 90 based on an identification code received from the printing apparatus 1, thereby obtains printing speed information (output speed information) of the connected printing apparatus 1.

The required image processing time calculation part 312 calculates required image processing time (required processing time) as time in which the execution of image processing must be completed based on the printing speed information obtained by the printing speed information acquisition part 311. Further, the required image processing time calculation part 312 may calculate the required image processing time in correspondence with the printing speed information obtained by the printing speed information acquisition part 311 and frequency of occurrence of image requiring processing by the image processing device 12.

The image processing command generation part 313 generates an image processing command including the required image processing time calculated by the required image processing time calculation part 312.

The image processing command output part 314 outputs the image processing command generated by the image processing command generation part 313 to the drawing control CPU 32 of the image processing device 12.

Here returning to FIG. 3, the external interface 33 is a communication interface for data transmission/reception to/from the system control CPU 31 and the image data storage part 14.

When the drawing control CPU 32 receives an image processing command (image processing request) from the system control CPU 31, the drawing control CPU 32 controls the drawing processors 61 to 63 to perform image processing required with the image processing command.

Note that the drawing control CPU 32 controls the operation of the image processing device 12 by performing predetermined processing based on a control program stored in a memory or storage device (not shown). Note that it may be arranged such that the control program is stored in a portable storage medium such as a CD-ROM and provided to the drawing control CPU 32.

The drawing processors (drawing processing units) 61 to 63 are processors to perform image processing designated with the drawing control CPU 32.

The memories 71 to 73 are provided in correspondence with the drawing processors 61 to 63. Image data processed by the drawing processors 61 to 63 is temporarily stored in the memories 71 to 73.

The drawing processors 61 to 63 respectively can directly transfer image data subjected to image processing to another drawing processor by pipeline processing. By the pipeline processing, the drawing processors independently perform the respective processing, such that a process of the next command is started before completion of a series of processing based on a previous command in a manner of flow system.

The power source circuits 51 to 53 supply power to the drawing processors 61 to 63 and the memories 71 to 73 based on control by the drawing control CPU 32. The drawing control CPU 32 can turn ON/OFF the powers of the drawing processors 61 to 63 and the memories 71 to 73 independently by controlling the power source circuits 51 to 53.

The drawing control CPU 32 determines a minimum number of drawing processors necessary to satisfy requirements of the image processing command, from the three drawing processors 61 to 63, in correspondence with the contents of the image processing command received from the system control CPU 31. The image processing command is used as an example of an image processing command.

Then the drawing control CPU 32 performs power source control so as to reduce power consumption by the drawing processor(s) other than drawing processor(s) determined as necessary processor(s) to satisfy the requirements of the image processing command. More particularly, the drawing control CPU 32 reduces power consumption by turning OFF the power of (blocking the power to) the drawing processor(s) other than the drawing processor(s) determined as necessary processor(s) to satisfy the requirements of the image processing command by controlling the power source circuits 51 to 53. The power source circuits 51 to 53 are used as an example of a power source controller.

Note that when the drawing processors 61 to 63 have a mode to reduce power consumption such as a power saving mode (power saving status), it may be arranged such that the drawing control CPU 32 reduces power consumption not by turning OFF the power to the drawing processor(s) determined as unnecessary processor(s) to satisfy the requirements of the image processing command, but changing the drawing processor(s) determined as unnecessary processor(s) into the power saving mode.

Next, a particular method for the drawing control CPU 32 to determine the number of drawing processors necessary to satisfy requirements of the image processing command will be described.

The image processing command, transmitted from the system control CPU 31, includes required processing time as time within which completion of execution of image processing is required. The drawing control CPU 32 determines drawing processors necessary to perform required image processing within the required processing time, from the three drawing processors 61 to 63, by calculating necessary image processing time by each image processing content included in the image processing command.

Next, the configuration of the drawing processor 61 will be described with reference to FIG. 6. In the following description, only the drawing processor 61 will be described; however, the drawing processors 62 and 63 have the same configuration.

As the drawing processor 61, a processor capable of dynamically selecting a circuitry in the chip (dynamic reconfigurable processor) is used.

Figure 6:
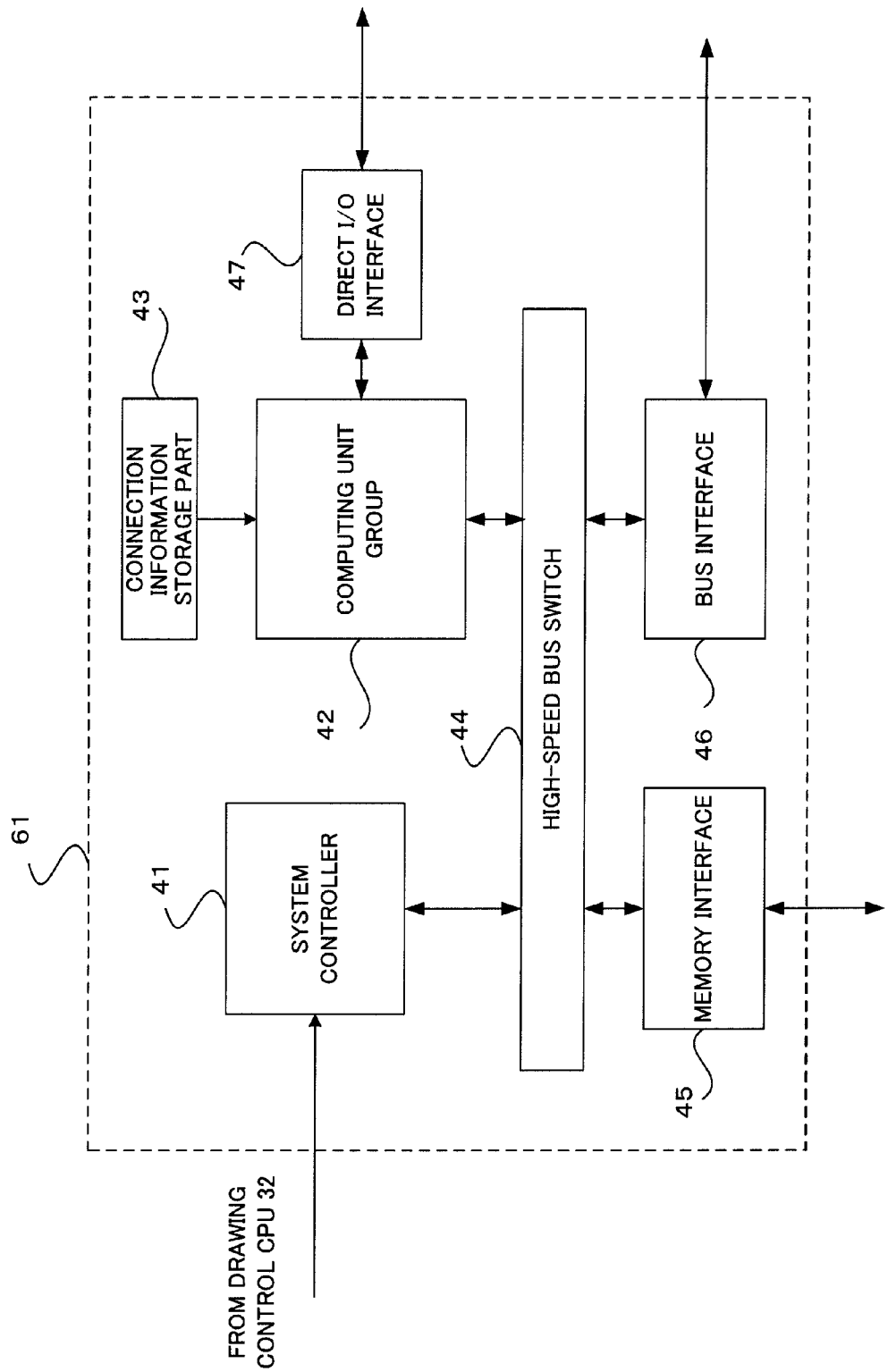
FIG. 6 is a block diagram showing a configuration of a drawing processor 61 in the image forming system according to the exemplary embodiment of the present invention.

As shown in FIG. 6, the drawing processor 61 has a system controller 41, a computing unit group 42, a connection information storage part 43, a high-speed bus switch 44, a memory interface 45, a bus interface 46, and a direct I/O interface 47.

The computing unit group 42 has various computing units such as an adder and a multiplier. The connection information storage part 43 holds connection information to realize an image processing function by combination of the various computing units of the computing unit group 42.

The system controller 41 operates as a function realization unit which realizes a required image processing function by combining the various computing units of the computing unit group 42 based on the connection information stored in the connection information storage part 43, in correspondence with a request from the drawing control CPU 32.

The memory interface 45 is an interface for data transmission/reception to/from the memory 71. The bus interface 46 is an interface for data transmission/reception to/from another circuit or the like connected to the outside. The direct I/O interface 47 is an interface for direct transfer of image data to the drawing processor 62 by pipeline processing.

The high-speed bus switch 44 is a bus switch for high-speed switching of data path between the system controller 41 and the computing unit group 42, and the memory interface 45 and the bus interface 46.

The drawing processors 61 to 63, having the above configuration, can realize respective designated image processing functions in a short time.

Next, the operation of the image forming system according to the present exemplary embodiment will be described in detail with reference to the drawings.

Figure 7:
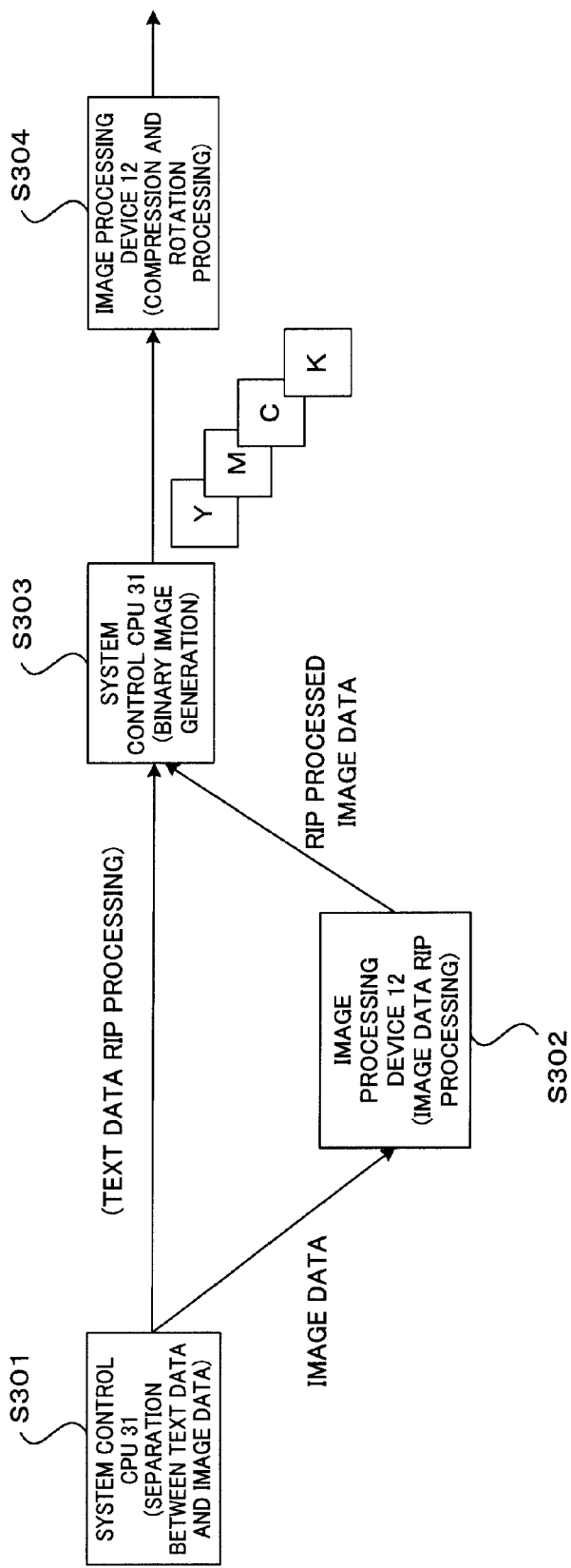
FIG. 7 is a flowchart showing the entire flow of RIP processing in the controller 10.

First, the flow of entire RIP (Raster Image Processing) processing in the controller 10 will be described with reference to FIG. 7.

The system control CPU 31 separates print job data received from the terminal device 20 into image data to be processed by the image processing device 12 and text data to be RIP-processed by software (step S301).

Then the system control CPU 31 transmits the image data, with an image processing command designating required image processing time, to the image processing device 12 (step S302). Note that the details of the method for setting the required image processing time will be described later.

Then, the image processing device 12 performs various image processing such as JPEG (Joint Photographic Experts Group) expansion processing, enlargement and/or reduction processing, and color space conversion processing on the received image data based on the received image processing command, and then performs RIP processing, to generate RIP-processed YMCK RAW images.

Note that the text data separated at step S301 is subjected to the RIP processing by the software in the system control CPU 31.

Then, the system control CPU 31 receives the RIP-processed image data from the image processing device 12, combines the RIP-processed image data with the text data RIP-processed by the software, and generates respective YMCK binary images (step S303).

Finally, the system control CPU 31 transmits the binary image data to the image processing device 12 again, to perform compression, rotation processing and the like (step S304).

Next, the method for setting required image processing time during generation of image processing command by the system control CPU 31 of the controller 10 will be described with reference to FIG. 8.

Figure 8:
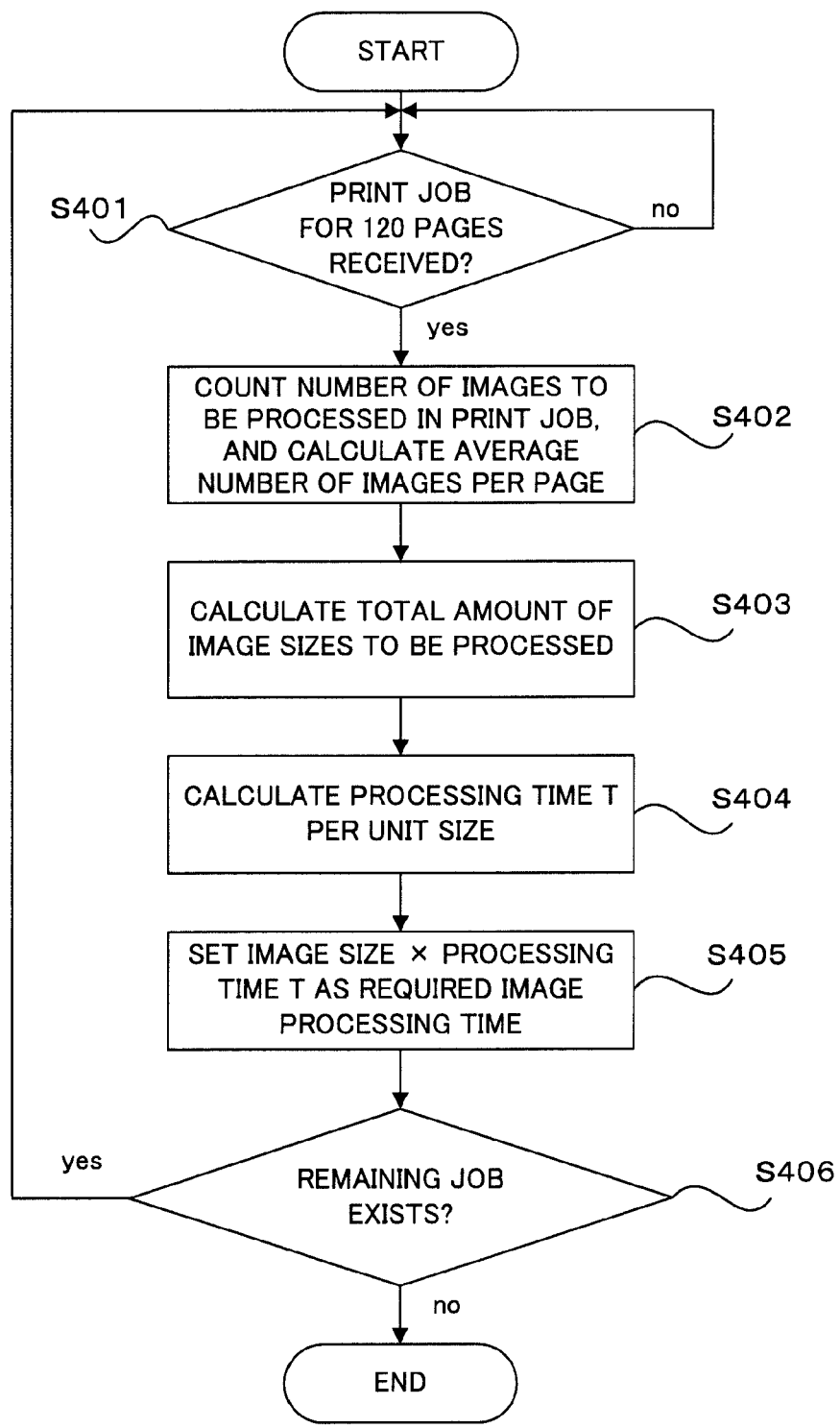
FIG. 8 is a flowchart showing a method for setting required image processing time in generation of an image processing command by the system control CPU 31 in the controller 10.

In the method for setting required image processing time shown in FIG. 8, required image processing time is calculated by using a frequency of occurrence of image (average number of images per page) in a print job for 120 pages.

First, when the print job for 120 pages is received (Yes at step S401), the number of images to be processed in the print job for 120 pages is counted, and an average number of images per page (frequency of occurrence of image) is calculated (step S402).

Then, a total amount of image sizes to be processed is calculated (step S403), and processing time T per unit size such as processing time per 1 M pixels is calculated (step S404).

Finally, the image size to be processed, designated for the image processing device 12, is multiplied by the processing time T calculated at step S404, and the required image processing time is obtained (step S405) Then, it is determined whether or not an unprocessed print job exists (step S406). When it is determined that an unprocessed print job remains, the process returns to step S401. When it is determined that no unprocessed print job exists, the process ends.

Next, the method for setting required image processing time will be described using a particular example.

For example, when printing speed information obtained from the printing apparatus 1 is 30 PPM (Page Per Minute), as the printing speed per one page, 1 (min)/30=2000 ms holds.

In this example, the number of images in the print job for 120 pages is 60, and the data amount of one image is 5000×7000 pixels. The total amount of image sizes included in the print job for 120 pages is calculated with the following expression.

$$5000 \times 7000 \times 60/(1024 \times 1024) \approx 2002.7 \text{(M pixels)}$$

Note that as the printing speed per page is 2000 ms, time for printing for 120 pages is 240 (seconds). Accordingly, when the unit size is 1 M pixels, the processing time T per unit size is calculated with the following expression.

$$T = 240/2002.7 \approx 120 \text{ ms}$$

Accordingly, the required image processing time for image processing on one image is calculated with the following expression.

$$5000 \times 7000/(1024 \times 1024) \times 120 \text{(ms)} \approx 4000 \text{ ms}$$

When the system control CPU 31 transmits an image processing command designating image processing on one image to the image processing device 12, the above-calculated required image processing time 4000 ms is set in the image processing command.

Note that when all the images in the print job have the same image size, required image processing time per image may be calculated with the following expression.

printing time for 120 pages/the number of images in 120 pages=120×2000(ms)/60=4000(ms)

Next, the operation of the image processing device 12 will be described, when an image processing command is transmitted from the system control CPU 31 to the image processing device 12.

Figure 9:
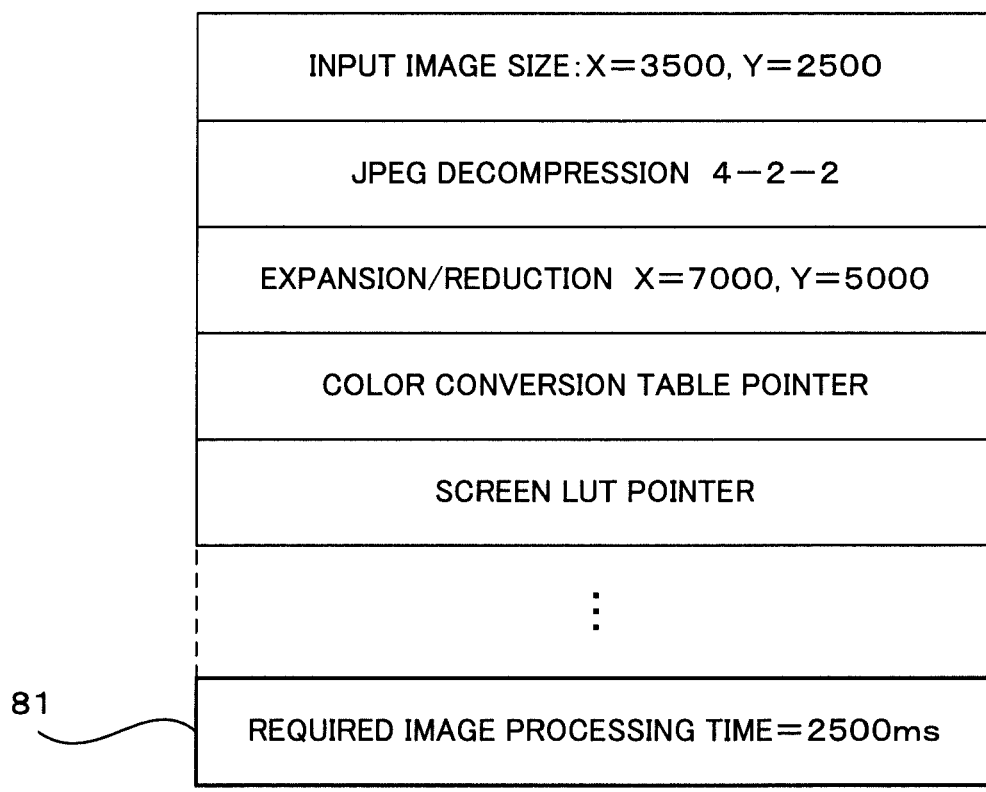
FIG. 9 is a table showing an example of an image processing command transmitted from a system control CPU 31 to a drawing control CPU 32.

In the following description, an image processing command as shown in FIG. 9 is transmitted from the system control CPU 31 to the drawing control CPU 32.

In the image processing command shown in FIG. 9, the input image size is lateral 3500 dots×vertical 2500 dots. The decompression format upon JPEG (Joint Photographic Experts Group) decompression is 4-2-2. It is required that an original image is converted to lateral 7000 dots×vertical 5000 dots image by expansion/reduction processing. Further, in the image processing command, a pointer to designate a color conversion table used in color conversion processing, and a pointer to designate a screen LUT (Look Up Table) used in screen processing are indicated. Further, in the image processing command, as required image processing time 81 as limited time from start of the image processing to the completion of the processing, 2500 ms is set.

FIG. 10 shows a processing time table used by the system controller 41 for calculation of time necessary for execution of respective image processing. In FIG. 10, 10 ms processing time per 1 M pixels is required for JPEG decompression processing; 30 ms processing time per 1 M pixels is required for expansion/reduction processing; and 30 ms processing time per 1 M pixels is required for rotation processing. Further, when image data stored in a memory is accessed and color conversion processing is performed on the image data, 20 ms processing time per 1 M pixels is required; and when screen processing is performed, 20 ms processing time per 1 M pixels is required. Note that when pipeline processing is performed for direct processing on image data transferred from another drawing processor, it is not necessary to consider the processing times for the color conversion processing and the screen processing.

Figure 11:
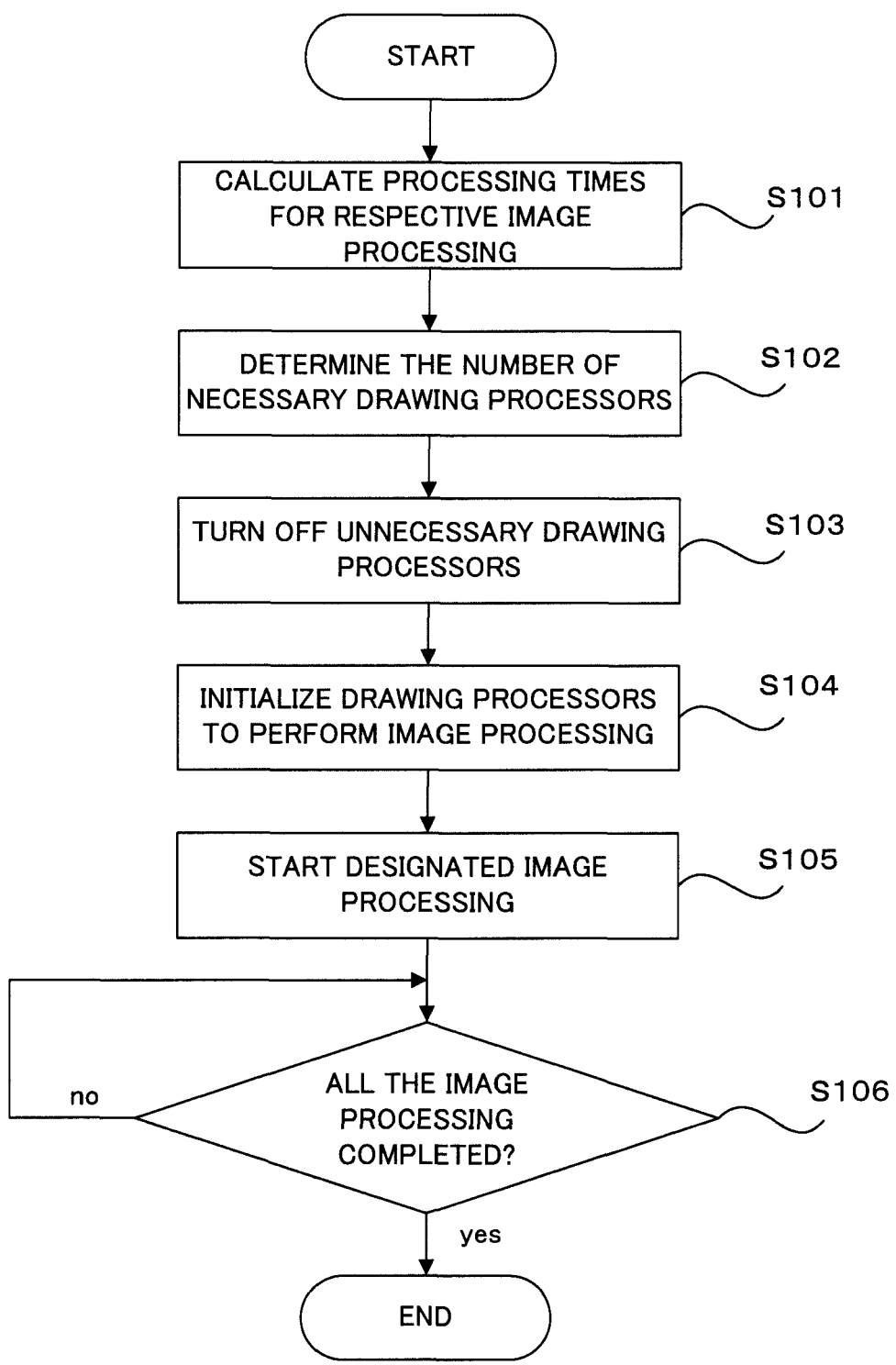
FIG. 11 is a flowchart showing an operation of the image processing device 12 in the image forming system according to the exemplary embodiment of the present invention.

FIG. 11 is a flowchart showing the operation of the image processing device 12 when the drawing control CPU 32 receives an image processing command as shown in FIG. 9.

The drawing control CPU 32, which has received the image processing command from the system control CPU 31, first calculates processing time necessary for execution of respective image processing required with the image processing command by referring to the processing time table as shown in FIG. 10 (step S101).

FIG. 12 shows an example of calculation of processing time by referring to the processing time table shown in FIG. 10 regarding the image processing command shown in FIG. 9. In FIG. 12, for example, processing time necessary for JPEG decompression processing is calculated as 83.34 ms. The 83.34 ms processing time is used as an example of calculated value of image processing time necessary for execution of image processing included in the image processing command. Note that in the image processing command shown in FIG. 9, as rotation processing is not included, time for execution of the rotation processing is not calculated in FIG. 12.

Next, the drawing control CPU 32 determines the number of drawing processors necessary for execution of all the image processing within the required processing time included in the image processing command based on the calculated processing times, and determines drawing processors in charge of the respective image processing (step S102). The details of the determination of the number of necessary drawing processors will be described later.

When the drawing processors necessary to realize the requirements of the image processing command have been determined, the drawing control CPU 32 issues commands to the power source circuits among the power source circuits 51 to 53 provided for unnecessary drawing processors to stop power supply (step S103). By this operation, power supply to the drawing processors other than the drawing processors necessary to realize the requirements of the image processing command is blocked.

Then, the drawing control CPU 32 performs initialization processing on the drawing processors determined to be used to realize the requirements of the image processing command, to realize respective corresponding image processing functions (step S104).

In the drawing processor initialized by the drawing control CPU 32, connection information to realize the designated image processing is read from the connection information storage part 43, and performed for the computing unit group 42, and the required image processing function is realized. Then, in the respective drawing processors, designated image processing is started with respect to input image data (step S105).

Then, in the respective drawing processors, when all the designated image processing has been performed, the processing is terminated (step S106).

Next, the details of the determination of the number of necessary drawing processors (step S102) shown in the flowchart of FIG. 11 will be described with reference to the flowchart of FIG. 13.

When processing times for the respective image processing included in the image processing command have been calculated by the method as shown in FIG. 12, the drawing control CPU 32 calculates a total value of all the image processing times (step S201). Then, the drawing control CPU 32 determines whether or not the total value of the image processing times is longer than the required image processing time (step S202).

The step S202 is used as an example of determination as to whether the respective image processing designated with the image processing command is performed by one of the plural drawing processing units or the respective image processing designated with the image processing command is performed by the plural drawing processing units, based on the image processing times necessary for execution of the respective image processing designated with the image processing command.

At step S202, when it is determined that the total value of the image processing times is equal to or shorter than the required image processing time (No at step S202), it is possible to complete all the image processing by one drawing processor within the required image processing time. Accordingly, the drawing control CPU 32 determines that the drawing processor 61 is in charge of all the image processing (step S203).

Note that when it is determined that only the drawing processor 61 is in charge of all the image processing, the powers of the drawing processors 62 and 63 are turned OFF.

At step S202, when it is determined that the total value of the image processing times is longer than the required image processing time (Yes at step S202), it is impossible to complete all the image processing by one drawing processor within the required image processing time. Accordingly, the drawing control CPU 32 determines whether or not the total value of the processing times for the JPEG decompression processing and the expansion/reduction processing is longer than the required image processing time (step S204).

At step S204, when it is determined that the total value of the processing times for the JPEG decompression processing and the expansion/reduction processing is equal to or shorter than the required image processing time (No at step S204), it is possible to complete the JPEG decompression processing and the expansion/reduction processing by one drawing processor within the required image processing time. Accordingly, the drawing control CPU 32 determines that the drawing processor 61 is in charge of the JPEG decompression processing and the expansion/reduction processing (step S205). Then, the drawing control CPU 32 determines that the drawing processor 62 is in charge of the other processing, i.e., the color conversion processing and the screen processing (step S206).

Note that when it is determined that the drawing processors 61 and 62 are to perform the image processing, the power of the drawing processor 63 is turned OFF.

At step S204, when it is determined that the total value of the processing times for the JPEG decompression processing and the expansion/reduction processing is longer than the required image processing time (Yes at step S204), it is impossible to complete the JPEG decompression processing and the expansion/reduction processing by one drawing processor within the required image processing time. Accordingly, the drawing control CPU 32 determines that the drawing processor 61 is in charge of only the JPEG decompression processing (step S207). Then the drawing control CPU 32 determines that the drawing processor 62 is in charge of only the expansion/reduction processing (step S208). Finally, the drawing control CPU 32 determines that the drawing processor 63 is in charge of the other processing, i.e. the color conversion processing and the screen processing (step S209).

Figure 13:
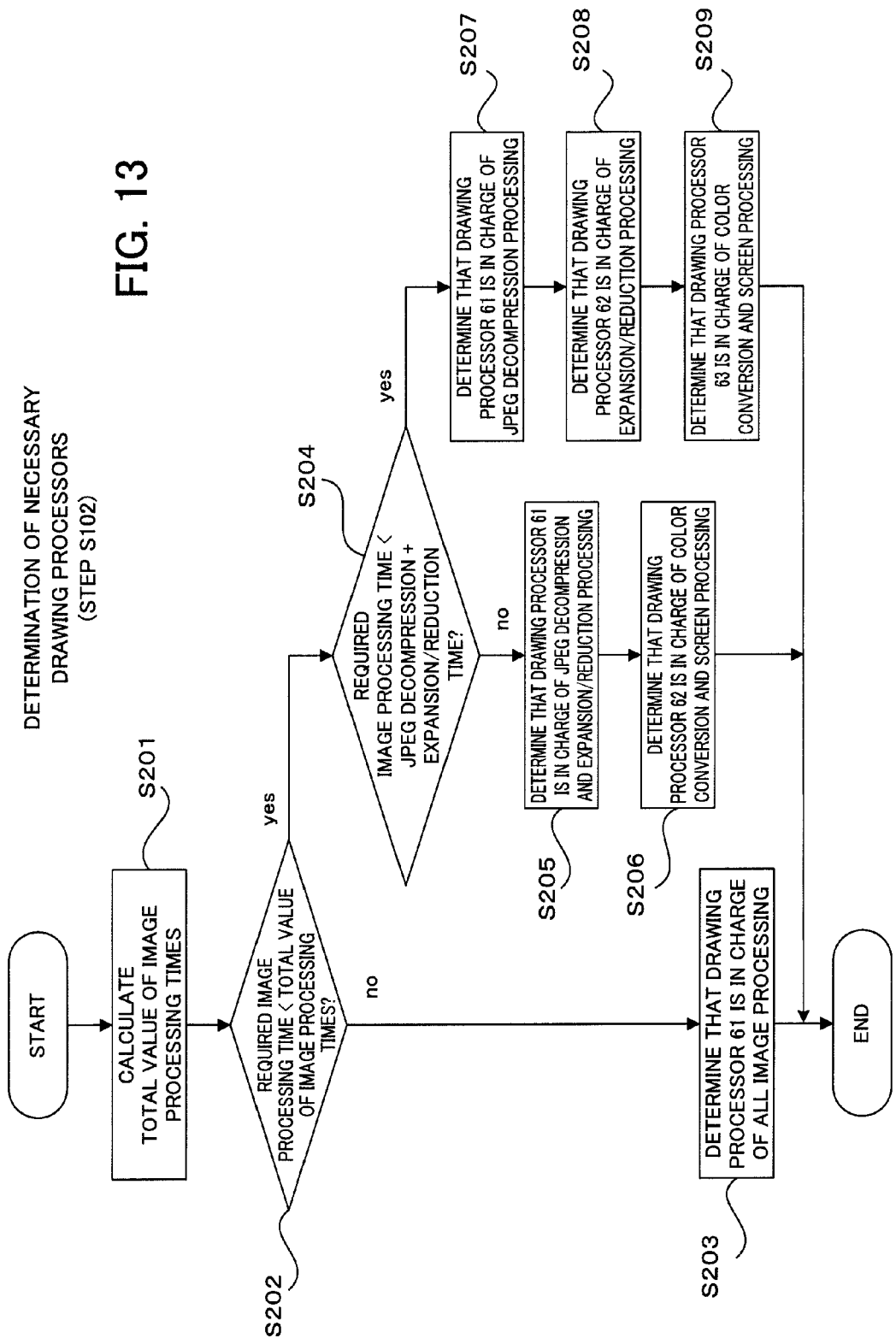
FIG. 13 is a flowchart showing the details of determination of the number of necessary drawing processors (step S102) shown in the flowchart of FIG. 11.

Note that the algorithm for selection of drawing processor shown in the flowchart of FIG. 13 is merely an example, and any other algorithm may be used as long as the number of necessary drawing processors and image processing steps to be performed by the respective drawing processors is determined.

By the above-described determination, even when the contents of image processing required with the image processing command are the same, the number of necessary drawing processors is changed in correspondence with the required processing time. FIG. 14 shows changes of the number of necessary drawing processors in correspondence with required processing time.

For example, in the image processing command shown in FIG. 9, since the required processing time is 2500 ms, it is determined that the drawing processor 61 is in charge of all the image processing. However, assuming that the required processing time is 1200 ms in the image processing command shown in FIG. 9, it is determined that the three drawing processor 61 to 63 are in charge of the respective image processing.

[Modification]

In the above-described exemplary embodiment, the present invention is applied to an image forming system to perform printing on a continuous sheet; however, the present invention is not limited to this system. For example, the present invention is similarly applicable to an image forming system to perform printing on a cut sheet.

Further, in the above-described exemplary embodiment, the drawing control CPU 32 in the image processing device 12 performs control of the power source circuits 51 to 53 and the like; however, the present invention is not limited to this arrangement. When it is arranged such that the system control CPU 31 in the controller 10 performs the function of the drawing control CPU 32, the drawing control CPU 32 in the image processing device 12 can be omitted.

Further, in the above-described exemplary embodiment, required image processing time included in an image processing command, transmitted from the system control CPU 31 to the drawing control CPU 32 in the image processing device 12, is calculated based on a printing speed of the connected printing apparatus 1, frequency of occurrence of image in a print job and the like. However, it may be arranged such that a user can set the required image processing time with an arbitrary value. In this case, the controller 10 is provided with a user interface as a setting unit that sets the required image processing time.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a plurality of drawing processing units that perform a plurality of types of image processing based on an image processing command designating the plurality of types of image processing;
a determination unit that allocates the respective image processing to one of the plurality of drawing processing units, or to the plurality of drawing processing units, according to an image processing time necessary for execution of the respective image processing; and
a power source controller that, in a case where the determination unit allocates the respective image processing to one of the plurality of drawing processing units, reduces power consumption of other drawing processing units than the one drawing processing unit, in comparison with a case where the respective image processing is allocated to the plurality of drawing processing units,
wherein the image processing command includes required processing time as time within which completion of execution of image processing is required,
the determination unit calculates the image processing time necessary for execution of the respective image processing included in the image processing command, and allocates the respective image processing to one of the plurality of drawing processing units, or to the plurality of drawing processing units, based on a calculated value and the required processing time, and
the required processing time is calculated based on output speed information of a connected image output apparatus and a total amount of image sizes included in a print job, and
the determination unit determines a number of drawing processing units, for allocating the respective image processing, according to the image processing time necessary for execution of the respective image processing, and allocates the respective image processing to the determined number of drawing processing units from among the plurality of drawing processing units.

2. The image processing apparatus according to claim 1, wherein in a case where the determination unit allocates the respective image processing to one of the plurality of drawing processing units, the power source controller reduces the power consumption by blocking power to the other drawing processing units than the one drawing processing unit.

3. The image processing apparatus according to claim 1, wherein in a case where the determination unit allocates the respective image processing to one of the plurality of drawing processing units, the power source controller reduces the power consumption by changing the other drawing processing units than the one drawing processing unit into a power saving status.

4. An image processing apparatus comprising:
a plurality of drawing processing units that perform a plurality of types of image processing based on an image processing command designating the plurality of types of image processing;
a determination unit that allocates the respective image processing to one of the plurality of drawing processing units, or to the plurality of drawing processing units, according to an image processing time necessary for execution of the respective image processing; and
a power source controller that, in a case where the determination unit allocates the respective image processing to one of the plurality of drawing processing units, reduces power consumption of other drawing processing units than the one drawing processing unit, in comparison with a case where the respective image processing is allocated to the plurality of drawing processing units,
wherein the image processing command includes required processing time as time within which completion of execution of image processing is required,
the determination unit calculates the image processing time necessary for execution of the respective image processing included in the image processing command, and allocates the respective image processing to one of the plurality of drawing processing units, or to the plurality of drawing processing units, based on a calculated value and the required processing time, and
the required processing time is calculated based on output speed information of a connected image output apparatus and a total amount of image sizes included in a print job.

5. The image processing apparatus according to claim 1, wherein the plurality of drawing processing units include:
a plurality of computing units;
a storage unit that stores connection information to realize an image processing function; and
a function realization unit that realizes a required image processing function by combining the plurality of computing units based on the connection information stored in the storage unit, in correspondence with an external request.

6. An image output control system comprising:
a plurality of drawing processing units that perform a plurality of types of image processing based on an image processing command designating the plurality of types of image processing;
a determination unit that allocates the respective image processing designated with the image processing command to one of the plurality of drawing processing units, or to the plurality of drawing processing units, according to an image processing time necessary for execution of the respective image processing;
a power source controller that, in a case where the determination unit allocates the respective image processing to one of the plurality of drawing processing units, reduces power consumption of the other drawing processing units than the one drawing processing unit, in comparison with a case where the respective image processing is allocated to the plurality of drawing processing units;
a calculation unit that calculates required processing time as time in which execution of image processing must be completed, based on output speed information of a connected image output apparatus;
a generation unit that generates an image processing command including the required processing time calculated by the calculation unit; and
an output unit that outputs the image processing command generated by the generation unit to the image processing device,
wherein the image processing command includes required processing time as time within which completion of execution of image processing is required,
the determination unit calculates the image processing time necessary for execution of the respective image processing included in the image processing command, and allocates the respective image processing to one of the plurality of drawing processing units, or to the plurality of drawing processing units, based on a calculated value and the required processing time, and the required processing time is calculated based on output speed information of a connected image output apparatus and a total amount of image sizes included in a print job, and the determination unit determines a number of drawing processing units, for allocating the respective image processing, according to the image processing time necessary for execution of the respective image processing, and allocates the respective image processing to the determined number of drawing processing units from among the plurality of drawing processing units.

7. The image output control system according to claim 6, wherein the calculation unit calculates the required processing time in correspondence with frequency of occurrence of image requiring processing by the image processing device.

8. An image forming system comprising:
an image processing apparatus including:
a plurality of drawing processing units that perform a plurality of types of image processing based on an image processing command designating the plurality of types of image processing;
a determination unit that allocates the respective image processing designated with the image processing command to one of the plurality of drawing processing units, or to the plurality of drawing processing units, according to an image processing time necessary for execution of the respective image processing designated with the image processing command; and
a power source controller that, in a case where the determination unit allocates the respective image processing to one of the plurality of drawing processing units, reduces power consumption of the other drawing processing units than the one drawing processing unit, in comparison with a case where the respective image processing is allocated to the plurality of drawing processing units; and
an image output apparatus that outputs an image based on image information subjected to image processing by the image processing apparatus,
wherein the image processing command includes required processing time as time within which completion of execution of image processing is required,
the determination unit calculates the image processing time necessary for execution of the respective image processing included in the image processing command, and allocates the respective image processing to one of the plurality of drawing processing units, or to the plurality of drawing processing units, based on a calculated value and the required processing time, and
the required processing time is calculated based on output speed information of a connected image output apparatus and a total amount of image sizes included in a print job, and
the determination unit determines a number of drawing processing units, for allocating the respective image processing, according to the image processing time necessary for execution of the respective image processing, and allocates the respective image processing to the determined number of drawing processing units from among the plurality of drawing processing units.

9. An image forming system comprising:
an image processing apparatus having:
a plurality of drawing processing units that perform a plurality of types of image processing based on an image processing command designating the plurality of types of image processing;
a determination unit that allocates the respective image processing designated with the image processing command to one of the plurality of drawing processing units, or to the plurality of drawing processing units, according to image processing time necessary for execution of the respective image processing designated with the image processing command; and
a power source controller that, in a case where the determination unit allocates the respective image processing to one of the plurality of drawing processing units, reduces power consumption of the other drawing processing units than the one drawing processing unit, in comparison with a case where the respective image processing is allocated to the plurality of drawing processing units;
an image output device that outputs an image based on image information image-processed by the image processing apparatus; and
a control apparatus having:
a calculation unit that calculates required processing time as time in which execution of image processing must be completed, based on output speed information of the connected image output apparatus;
a generation unit that generates an image processing command including the required processing time calculated by the calculation unit; and
an output unit that outputs the image processing command generated by the generation unit to the image processing device,
wherein the image processing command includes required processing time as time within which completion of execution of image processing is required,
the determination unit calculates the image processing time necessary for execution of the respective image processing included in the image processing command, and allocates the respective image processing to one of the plurality of drawing processing units, or to the plurality of drawing processing units, based on a calculated value and the required processing time, and
the required processing time is calculated based on output speed information of a connected image output apparatus and a total amount of image sizes included in a print job, and
the determination unit determines a number of drawing processing units, for allocating the respective image processing, according to the image processing time necessary for execution of the respective image processing, and allocates the respective image processing to the determined number of drawing processing units from among the plurality of drawing processing units.

10. A non-transitory computer readable medium storing a program causing a computer to execute a process for image processing, the process comprising:
designating a plurality of types of image processing with an image processing command;
performing the image processing based on designation of the image processing command by a plurality of drawing processing units;
allocating the respective image processing designated with the image processing command to one of the plurality of drawing processing units, or to the plurality of drawing processing units, according to image processing time necessary for execution of the respective image processing; and
in a case where the respective image processing is allocated to one of the plurality of drawing processing units, reducing power consumption of other drawing processing units than the one drawing processing unit, in comparison with a case where the respective image processing is allocated to the plurality of drawing processing units, wherein the image processing command includes required processing time as time within which completion of execution of image processing is required, the allocating comprises calculating the image processing time necessary for execution of the respective image processing included in the image processing command, and allocating the respective image processing to one of the plurality of drawing processing units, or to the plurality of drawing processing units, based on the calculated value and the required processing time, the required processing time is calculated based on output speed information of a connected image output apparatus and a total amount of image sizes included in a print job, and the allocating further comprises determining a number of drawing processing units, for allocating the respective image processing, according to the image processing time necessary for execution of the respective image processing, and allocating the respective image processing to the determined number of drawing processing units from among the plurality of drawing processing units.

11. A non-transitory computer readable medium storing a program causing a computer to execute a process for image processing, the process comprising:

calculating required processing time as time in which execution of image processing must be completed based on output speed information of a connected image output apparatus;

designating an input plurality of types of image processing with an image processing command including the calculated required processing time;

executing the plurality of types of image processing by a plurality of drawing processing units based on designation of the image processing command;

allocating the respective image processing designated with the image processing command to one of the plurality of drawing processing units, or to the plurality of drawing processing units, according to an image processing time necessary for execution of the respective image processing; and reducing power consumption of the other drawing processing units than the one drawing processing unit, in a case where the respective image processing is allocated to one of the plurality of drawing processing units, in comparison with a case where the respective image processing is allocated to the plurality of drawing processing units, wherein the image processing command includes required processing time as time within which completion of execution of image processing is required, the allocating comprises calculating the image processing time necessary for execution of the respective image processing included in the image processing command, and allocating the respective image processing to one of the plurality of drawing processing units, or to the plurality of drawing processing units, based on the calculated value and the required processing time, the required processing time is calculated based on output speed information of a connected image output apparatus and a total amount of image sizes included in a print job, and the allocating further comprises determining a number of drawing processing units, for allocating the respective image processing, according to the image processing time necessary for execution of the respective image processing, and allocating the respective image processing to the determined number of drawing processing units from among the plurality of drawing processing units.

12. An image processing apparatus comprising:

a plurality of drawing processing units that perform a plurality of types of image processing based on an image processing command designating the plurality of types of image processing;

a determination unit that allocates the respective image processing to one of the plurality of drawing processing units, or to the plurality of drawing processing units, according to an image processing time necessary for execution of the respective image processing; and a power source controller that, in a case where the determination unit allocates the respective image processing to one of the plurality of drawing processing units, reduces power consumption of other drawing processing units than the one drawing processing unit, in comparison with a case where the respective image processing is allocated to the plurality of drawing processing units, wherein the determination unit determines a number of drawing processing units, for allocating the respective image processing, according to the image processing time necessary for execution of the respective image processing, and allocates the respective image processing to the determined number of drawing processing units from among the plurality of drawing processing units.

13. The image processing apparatus according to claim 1, wherein the image processing time necessary for execution of the respective image processing is calculated in correspondence with frequency of occurrence of one or more images requiring processing by the image processing apparatus.

14. The image processing system according to claim 8, wherein the image processing time necessary for execution of the respective image processing is calculated in correspondence with frequency of occurrence of one or more images requiring processing by the image processing apparatus.

15. The image processing system according to claim 9, wherein the calculation unit calculates the image processing time necessary for execution of the respective image processing in correspondence with frequency of occurrence of one or more images requiring processing by the image processing apparatus.

16. The non-transitory computer readable medium of claim 10, wherein the image processing time necessary for execution of the respective image processing is calculated in correspondence with frequency of occurrence of one or more images requiring the image processing.

17. The non-transitory computer readable medium of claim 11, wherein the image processing time necessary for execution of the respective image processing is calculated in correspondence with frequency of occurrence of one or more images requiring the image processing.

* * * * *